United States Patent
Manica et al.

(10) Patent No.: US 11,691,468 B2
(45) Date of Patent: Jul. 4, 2023

(54) EQUAL ANGLE HITCH

(71) Applicant: Deere & Company, Moline, IL (US)

(72) Inventors: Edgar Manica, Nuevo León (MX); Hector G. Martinez, Nuevo León (MX); Eduardo Luna Pacheco, Nuevo León (MX)

(73) Assignee: Deere & Company, Moline, IL (US)

( * ) Notice: Subject to any disclaimer, the term of this patent is extended or adjusted under 35 U.S.C. 154(b) by 505 days.

(21) Appl. No.: 16/866,661

(22) Filed: May 5, 2020

(65) Prior Publication Data
US 2021/0345535 A1    Nov. 11, 2021

(51) Int. Cl.
 *B60D 1/46* (2006.01)
 *B60D 1/02* (2006.01)
 *B60D 1/167* (2006.01)
 *B60D 1/145* (2006.01)

(52) U.S. Cl.
 CPC ............... *B60D 1/46* (2013.01); *B60D 1/02* (2013.01); *B60D 1/167* (2013.01); *B60D 1/145* (2013.01)

(58) Field of Classification Search
 CPC ............ B60D 1/46; B60D 1/02; B60D 1/167
 See application file for complete search history.

(56) References Cited

U.S. PATENT DOCUMENTS

| | | | | |
|---|---|---|---|---|
| 3,557,892 A | * | 1/1971 | Burrough | A01B 71/066 180/14.1 |
| 4,403,670 A | * | 9/1983 | Sammarco | B60D 1/54 280/515 |
| 5,156,216 A | | 10/1992 | Van Mill | |
| 5,186,271 A | * | 2/1993 | McLean | A01B 71/066 180/53.6 |
| 6,328,327 B1 | * | 12/2001 | Ligouy | A01B 59/042 280/492 |
| 6,776,432 B2 | * | 8/2004 | Harkcom | B60K 25/06 172/74 |
| 6,877,758 B2 | * | 4/2005 | Colistro | B60D 1/167 280/492 |
| 7,204,318 B2 | * | 4/2007 | Taylor | A01B 71/066 172/450 |
| 9,604,512 B2 | | 3/2017 | Dueck et al. | |

FOREIGN PATENT DOCUMENTS

FR    2989033 A1    10/2013
WO    16041979 A1    3/2016

* cited by examiner

*Primary Examiner* — Kevin Hurley
(74) *Attorney, Agent, or Firm* — Tucker Ellis LLP; Michael G. Craig; Heather M. Barnes (57) ABSTRACT

One or more techniques and/or systems are disclosed for a hitch system that couples a vehicle to an implement powered by the vehicle using a driveshaft supplying power from a power output to the implement. The hitch system comprises a front portion and rear portion, with a mid-yaw pivot coupling the front and rear portions. The front portion couples to a drawbar engaged with the vehicle, and the rear portion couples with the implement. The mid-yaw pivot can be disposed substantially equidistant from a power output of the vehicle and a power input to the implement. This arrangement can provide, during operation, for the angle between the power output and driveshaft to be substantially equal to the angle between the power input and driveshaft. This may provide for improved performance in the implement, including reduced vibration, lower weight, and less maintenance.

10 Claims, 12 Drawing Sheets

EQUAL ANGLE HITCH

BACKGROUND

In agriculture, construction, and other industrial and some commercial settings, a vehicle, such as a tractor, can be used to tow and power an implement, such as a cutting deck or other power device. The vehicle can have a power take off (PTO), comprising a power output, which takes power from the transmission, provided by the engine, and provides it to the PTO power output. A driveshaft can be coupled with the PTO output, and coupled to an implement power input, to provide the power taken from the vehicle to the implement. The power provided at the input can power systems on the implement, such as any type of PTO powered systems. Often, the driveshaft has a constant velocity (CV) joint to provide mitigate power loss when the vehicle makes turns towing the implement. The vehicle can also be coupled to the implement using a hitch, which physically attaches them together so that the vehicle can effectively tow the implement.

SUMMARY

This Summary is provided to introduce a selection of concepts in a simplified form that are further described below in the Detailed Description. This Summary is not intended to identify key factors or essential features of the claimed subject matter, nor is it intended to be used to limit the scope of the claimed subject matter.

One or more techniques and systems are described herein for a hitch system that couples a vehicle to an implement powered by the vehicle using a driveshaft supplying power from a power take off (PTO) the implement. The hitch system, can provide for substantially equivalent angles between the PTO and driveshaft and the power input and driveshaft, thereby allowing for a driveshaft without a constant velocity (CV) joint. That is, for example, during operation of the vehicle coupled with the implement the angle between the PTO and driveshaft can be substantially equal to the angle between the power input and driveshaft. Use of such a hitch system can provide for improved ease of connection, reduce weight, and reduce driveline vibration, providing for reduction in cost, wear and maintenance on the driveshaft.

In one implementation of a hitch system for coupling a vehicle to an implement, a front member can comprise a body at the rear and a drawbar adapter at the front to couple with a drawbar of a vehicle. Further, a pivot member can be pivotably engaged with the rear of the front member in a yaw axis. Additionally, a rear member can comprise at least one arm that is pivotably engaged with the rear of the pivot member in a first pitch axis at the front of the rear member. The rear member can also be pivotably engagable with an implement in a second pitch axis at the rear of the rear member. In this implementation, the yaw axis can be disposed substantially equidistant from a power takeoff output of the vehicle and a power takeoff input to the implement.

To the accomplishment of the foregoing and related ends, the following description and annexed drawings set forth certain illustrative aspects and implementations. These are indicative of but a few of the various ways in which one or more aspects may be employed. Other aspects, advantages and novel features of the disclosure will become apparent from the following detailed description when considered in conjunction with the annexed drawings.

DETAILED DESCRIPTION

The claimed subject matter is now described with reference to the drawings, wherein like reference numerals are generally used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, structures and devices are shown in block diagram form in order to facilitate describing the claimed subject matter.

A hitch system may be devised for coupling a vehicle, such as a towing vehicle (e.g., a tractor or similar agricultural or landscaping vehicle), to an implement, such as a cutting deck or other agricultural or landscaping implement, where a driveshaft couples a power take off (PTO) from the vehicle to a power input of the implement. Typically, such a drive shaft uses a constant velocity (CV) joint to account for unequal angles between the PTO and driveshaft and power input and the driveshaft, which are provided by typical hitches where the yaw axis is not set equidistant from both ends. The hitch system, described herein, can provide for substantially equivalent angles between the PTO and driveshaft and the power input and driveshaft, thereby allowing for a driveshaft without a CV joint. That is, for example, during operation of the vehicle coupled with the implement using the hitch system described herein, the angle between the PTO and driveshaft can be substantially equal to the angle between the power input and driveshaft. In some implementations, using a driveshaft without a CV joint can substantially reduce weight, provide for reduction in driveline vibration and component wear. Further, the hitch system described herein can allow for improved ease of coupling the implement with the vehicle.

As one example, a double Cardan joint driveshaft can be used to couple the PTO output with the input to the splitter driven shaft. In this example, the configuration can utilize two U-joints joined by an intermediate shaft. In this configuration, the second U-joint is phased in relation to the first U-joint to cancel the changing angular velocity. In this example, the angular velocity of the driven shaft can match that of the driving shaft, provided that both the driving shaft and the driven shaft are at substantially equal angles with respect to the intermediate shaft. In this configuration, the respective U-joints may not need to be in the same plane, and the two universal joints are disposed degrees out of phase.

FIGS. 1-5 are component diagrams illustrating views of one or more portions of an exemplary implementation 100 of a hitch system 100. In this implementation 100, the example hitch can comprise a front portion 102. The front portion 102 can comprise a drawbar adapter 112 that operably engages with a drawbar 110 at a drawbar attachment axis 114 (e.g., in a front yaw axis), which is coupled with a vehicle. The front portion 102 can also comprise a rear coupler 558, such as a pin coupler 118, that is disposed in a mid-yaw axis 116. Further, a rear portion 105 can comprise a rear member 106 that operably engages with an implement, for example, that can be towed by the vehicle. The rear portion 105 can comprise a front coupler 344 that is operably coupled with the rear coupler 558 of the front portion 102 in the mid yaw axis 116. The mid yaw axis 116 coupling between the front portion 102 and the rear portion 105 can provide for pivoting 576 about the mid yaw axis 116 between the front portion 103 and the rear portion 105.

Figure 9:
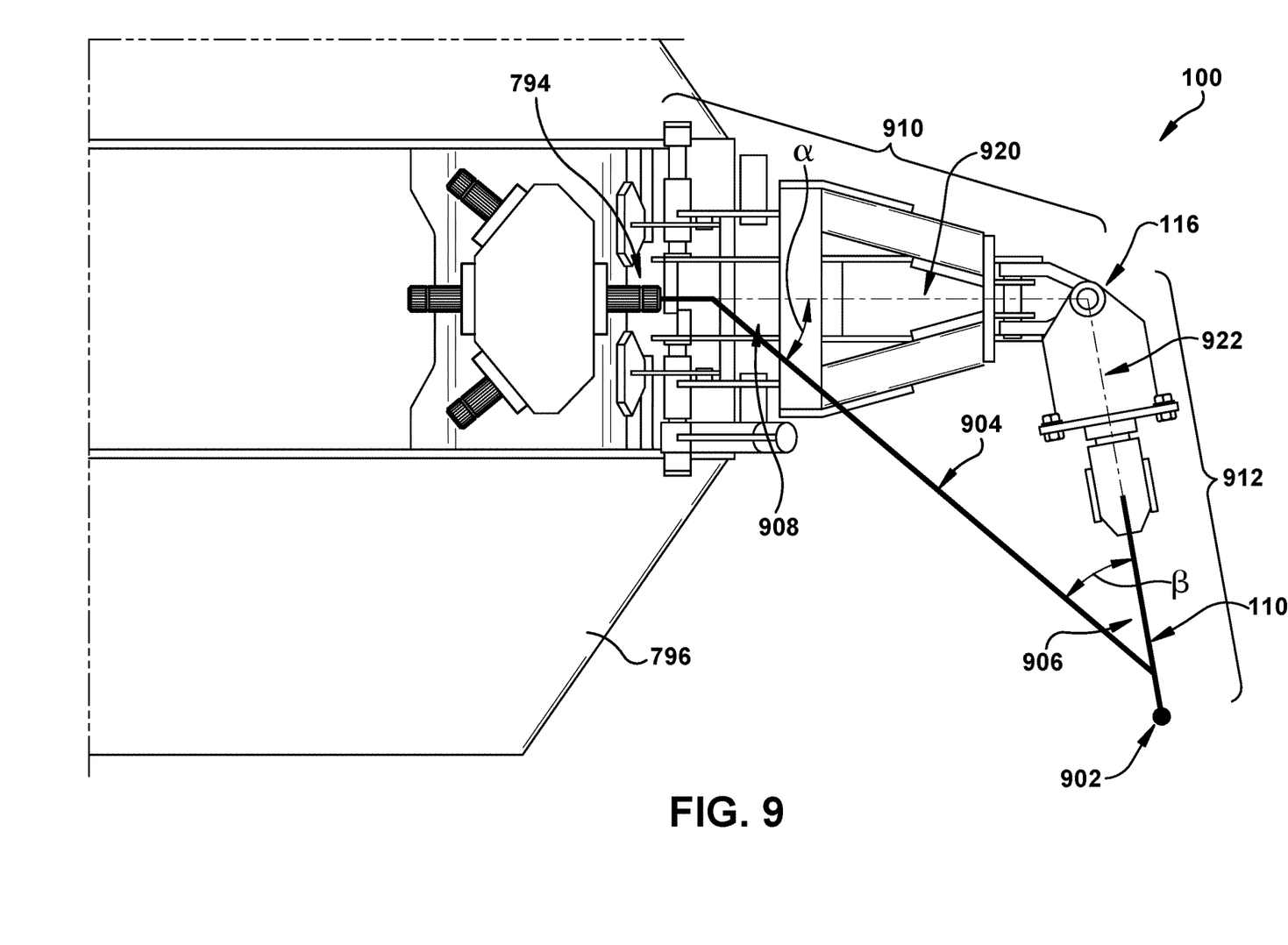
FIG. 9 is a component diagram illustrating one implementation of one or more portions of one or more systems described herein.
Figure 10:
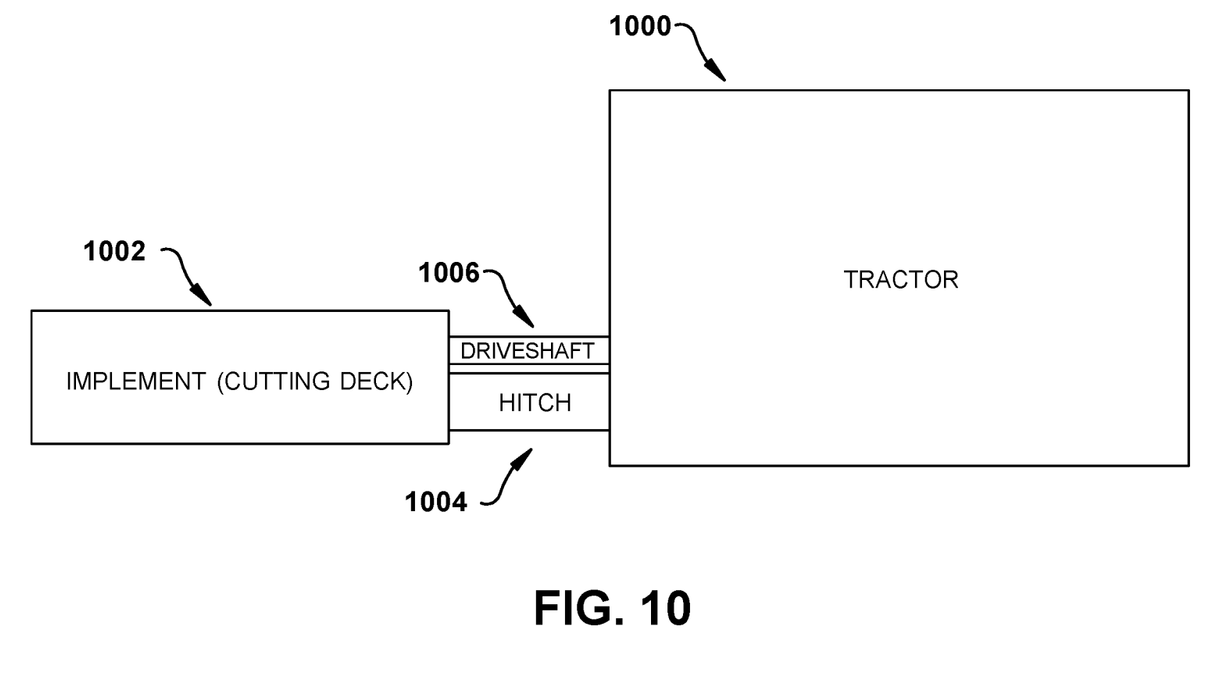
FIG. 10 is a component diagram illustrating one embodiment of implementation of portions of one or more systems described herein.

As illustrated in FIG. 9, a first distance 910 can comprise a distance between the mid yaw axis 116 and a power input 794 for an implement 796. Further, a second distance 912 can comprise a distance between the mid yaw axis 116 and a power output 902 from a coupled vehicle. That is, for example, as further illustrated by FIG. 10, a vehicle 1000, such as a tractor, can comprise a power take off (PTO) which provides a power output 902 (e.g., from a tractor, vehicle, machine, etc.) that can be used to power attachments and/or implements (e.g., coupled with the vehicle or other power output), as by the exemplary hitch 1004 described herein. In this example implementation, the power output 902 can be coupled to a power input 794 for an implement 796, such as a cutting deck 1002, by a drive shaft 904, 1006 (a.k.a., driveline). In this example, the rotary power provided by the power output 902 coupler can be transferred to the driveshaft 904, 1006 which can then be transferred to the coupler for the power input 794. As described above, the mid yaw axis 116 can be disposed equidistant from the power output 902 and power input 794.

Further, as illustrated in FIG. 9, the first distance 910 can be substantially equal to the second distance 912, as provided by the location of the mid yaw axis 116, which provides a central pivot point between the power input 794 and the power output 902. In this implementation, a rear central axis 920 lies along a line between the power input 794 and the mid yaw axis 116 (e.g., coupling between the front portion 102 and rear portion 105); and a front central axis 922 lies along a line between the power output 902 and themed yaw axis 116. Further, a first angle α 908 is created between the rear central axis 920 and the driveshaft 904; and a second angle β 906 is created between the front central axis 922 and the driveshaft 904. The position of the mid yaw axis 116 provides for the first angle α 908 to be substantially equivalent to the second angle β 906, for example, when the vehicle 1000 turns, resulting in the hitch pivoting about the mid yaw axis 116.

In this way, for example, as described above, because the first angle α 908 is substantially equivalent to the second angle β 906, a CV joint may not be needed in the driveshaft 904, for example, which is typically used when unequal angles are generated during a turn. In this way, for example, less weight (e.g., up to forty pounds) is applied to the driveshaft 904. Further, the substantially equal angles provided by the hitch described herein can result is less vibration from the driveshaft, resulting in improved performance, and less wear and maintenance for the system (e.g., vehicle PTO, implement power input, driveshaft, etc.). Additionally, the position and configuration of the mid yaw axis 116, provided by the coupling between the front portion 102 and rear portion 105, may be able to provide for a tighter turning radius for the implement 796. As a result, for example, the implement may have improved performance, such as improved cutting, and improved speed of performance (e.g., faster cutting).

Figure 1:
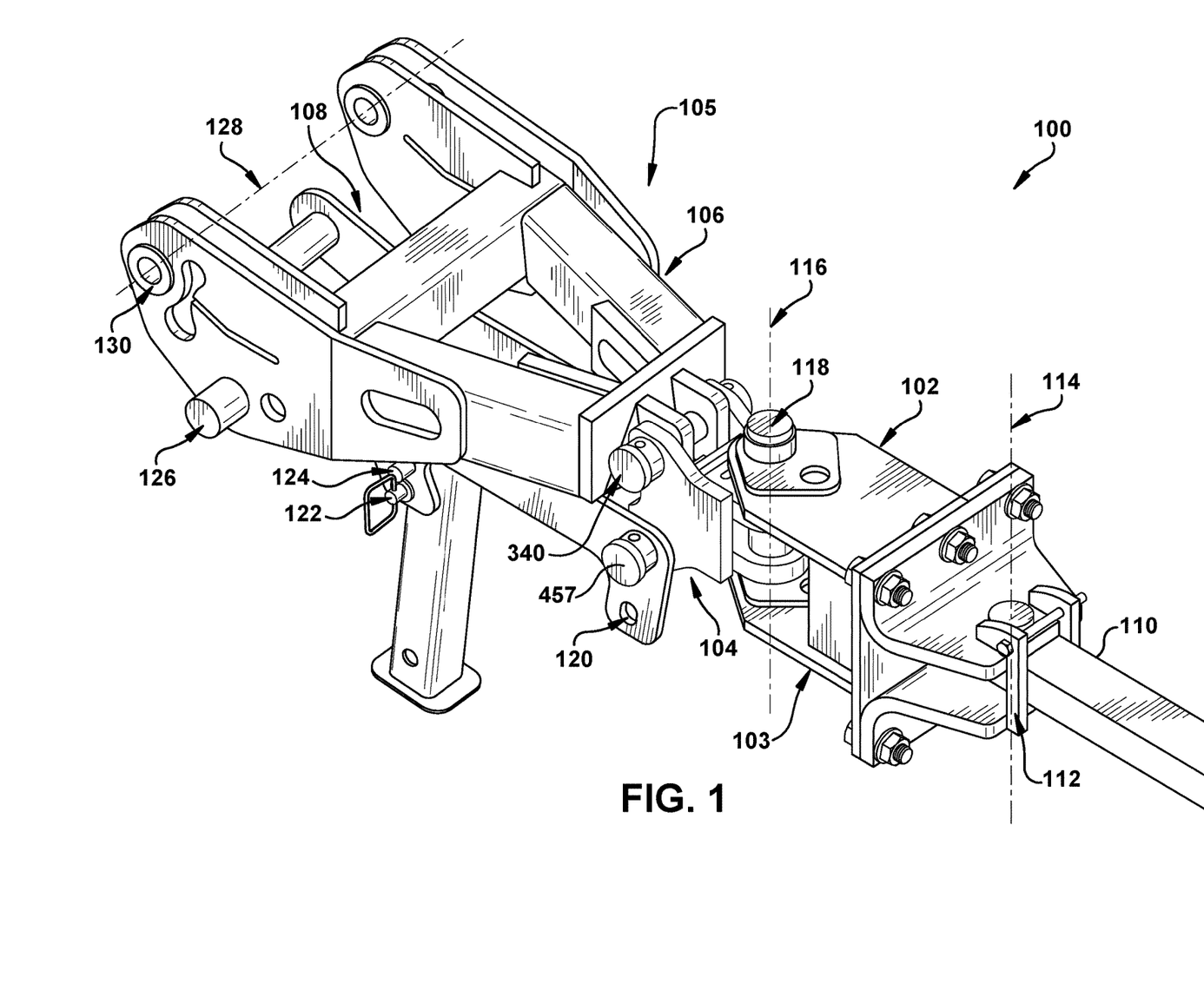
FIG. 1 is a component diagram illustrating one implementation of an example hitch system for coupling a vehicle to an implement.
Figure 5A:
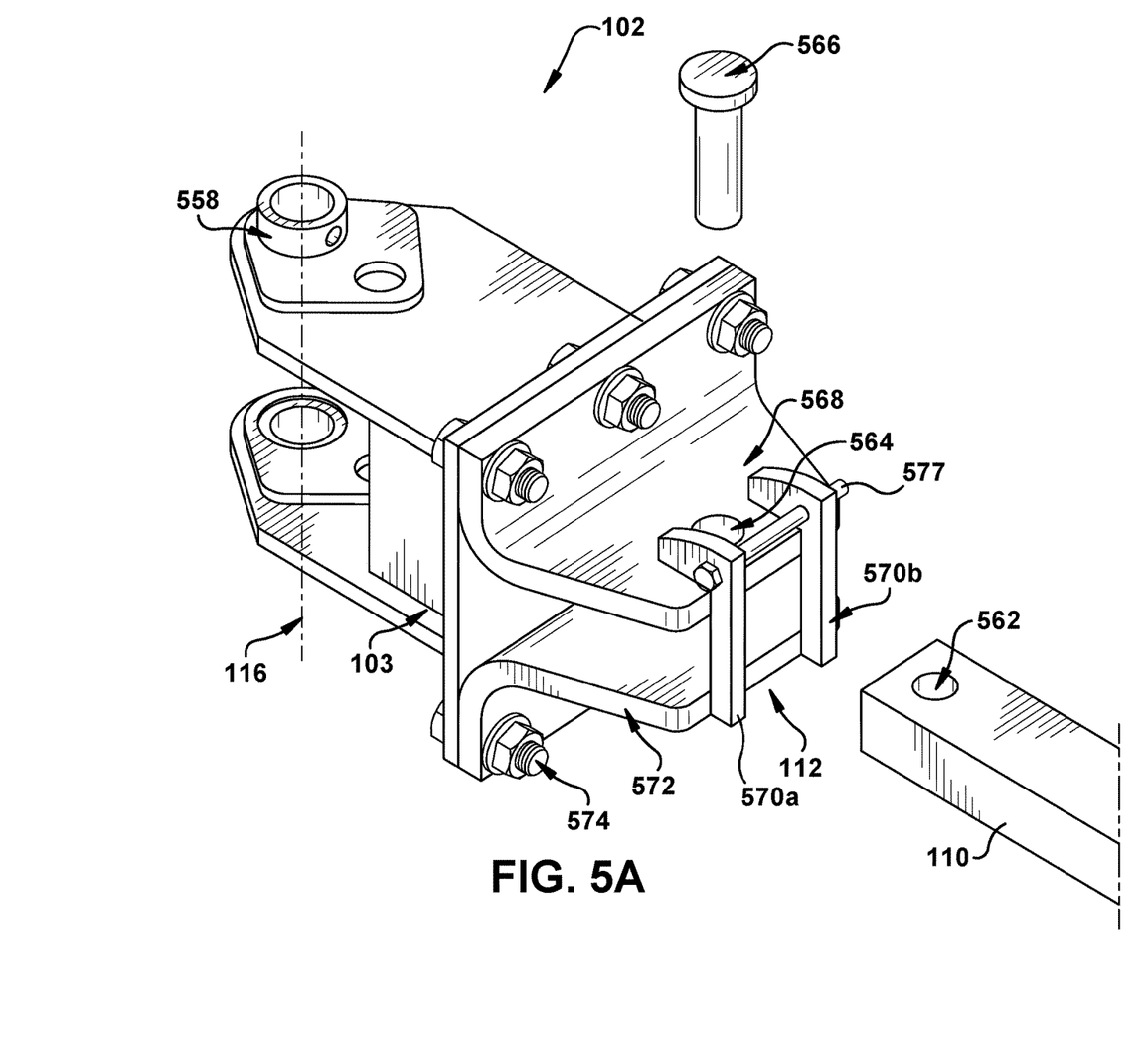
FIGS. 5A and 5B are component diagrams illustrating one implementation of one or more portion of one or more systems described herein.
Figure 5B:
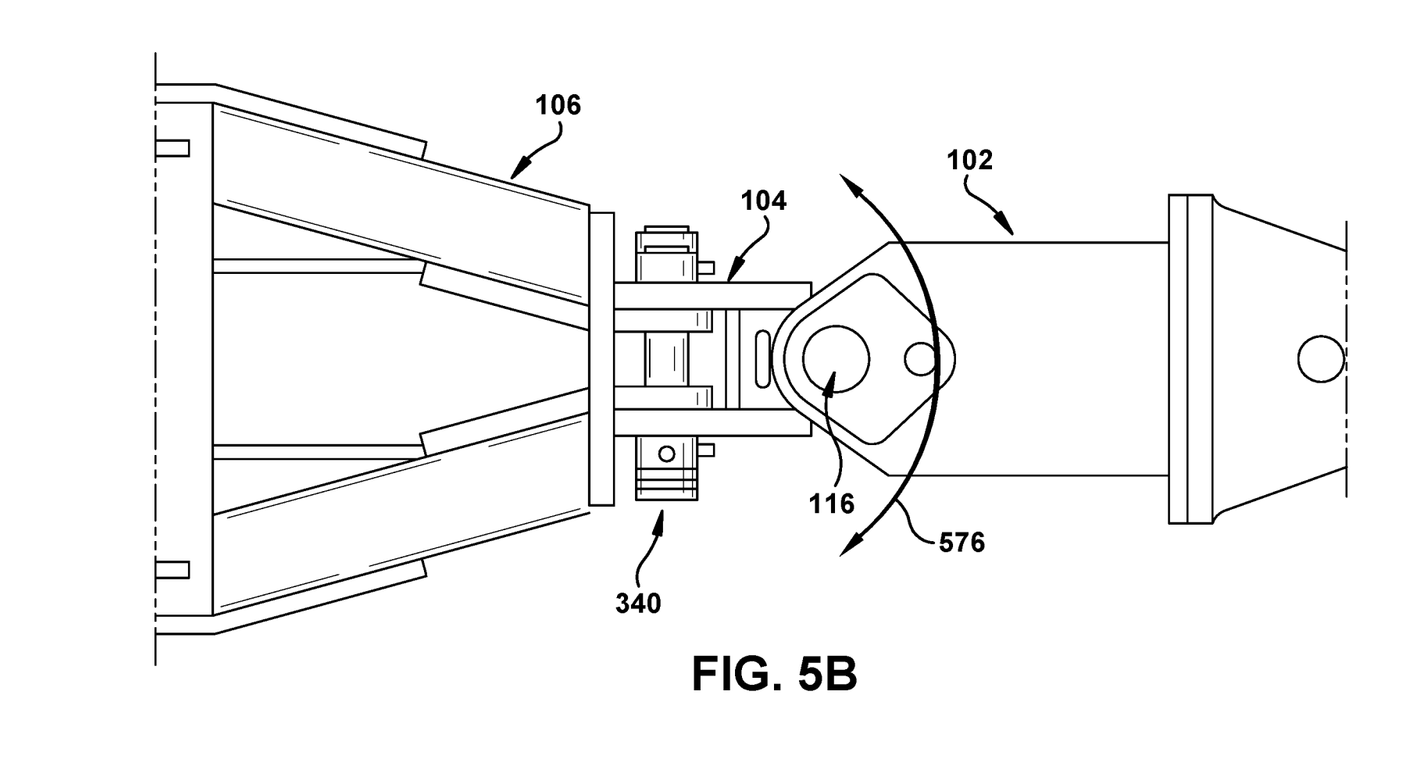

As illustrated in FIGS. 1 and 5A, the front portion 102 can comprise a front member 103 at the rear of the front portion that is operably, fixedly engaged with the drawbar adapter 112. In this example, the body of the front member 103 can comprise the rear coupler 558 that comprise an opening sized to receive a coupling pin 118 that couples the front portion 102 to the rear portion 105. That is, for example, the front portion 102 can comprise the body of the front member 103 at the rear and the drawbar adapter 112 at the front. The front member 103 can comprise a body that is separately formed from, and fixedly coupled to, the drawbar adapter, such that the drawbar adapter is selectably removable using one or more fasteners 574, in one implementation as illustrated in FIG. 5A. In another implementation, the body of the front member 103 can be integral with at least one or more portions of the drawbar adapter 112.

Further, the front member 103 can comprise the rear coupler 558, which can comprise one or more holes that are sized to fit a coupling pin (e.g., 118 of FIG. 1). Further, the rear coupler 558 can comprise one or more bushings that are sized to fit the coupling pin. As illustrated in FIG. 5A, the rear coupler 558 can comprise a top and bottom plate respectively comprising holes that are fitted with bushings to receive the coupling pin. In this way, for example, the mid yaw axis 116 can be disposed through the central portion of the respective bushings.

In one implementation the drawbar adapter 112 can comprise a width adapter to mitigate yaw rotation (e.g., around the drawbar attachment axis or front yaw axis 114) of the drawbar 110 with respect to the drawbar adapter 112. That is, for example, the width adapter can adapt to the width of the drawbar, which may be of various sizes, to mitigate a side-to-side swing of the drawbar to stabilize it in place. In one example, as illustrated in FIG. 5A, the drawbar adapter 112 can comprise a first side wall 570a and a second side wall 570b that are respectively, operably disposed on either side of the drawbar 110. In some implementations, the drawbar adapter 112 can comprise a top plate 568 and a bottom plate 572 that are disposed above and below the drawbar 110 when coupled with the front portion 102.

Further, as illustrated in FIG. 5A, the drawbar adapter 112 can comprise an adjustment mechanism 577 that is coupled with respective side walls 570 to adjust a distance between the first and second side walls 570a, 570b. In this example, the adjustment mechanism 577 can comprise a fastener that is tightened to reduce the distance between the side walls 570, or loosened to increase the distance between the side walls 570. In this way, for example, a pin (566) can be inserted through a front coupling 564 of the drawbar adapter 112 (e.g., at the drawbar attachment or front yaw axis 114), and through a drawbar coupling 562 on the drawbar, thereby coupling the drawbar 110 with the front portion 102. Further, in this example, the adjustment mechanism 577 can be adjusted to accommodate the width of the drawbar, 110, and to mitigate side-to-side movement in the drawbar adapter 112. That is, for example, the adjustment mechanism 577 can comprise a threaded bolt that can be threadedly engaged with one of the side walls 570 and slidably engaged with the other side wall. In this example, the bolt can be threaded into the side wall to close the space between the side walls 570, or threaded out of the side wall to increase the gap between the side walls 570 to accommodate different drawbar widths.

Figure 2:
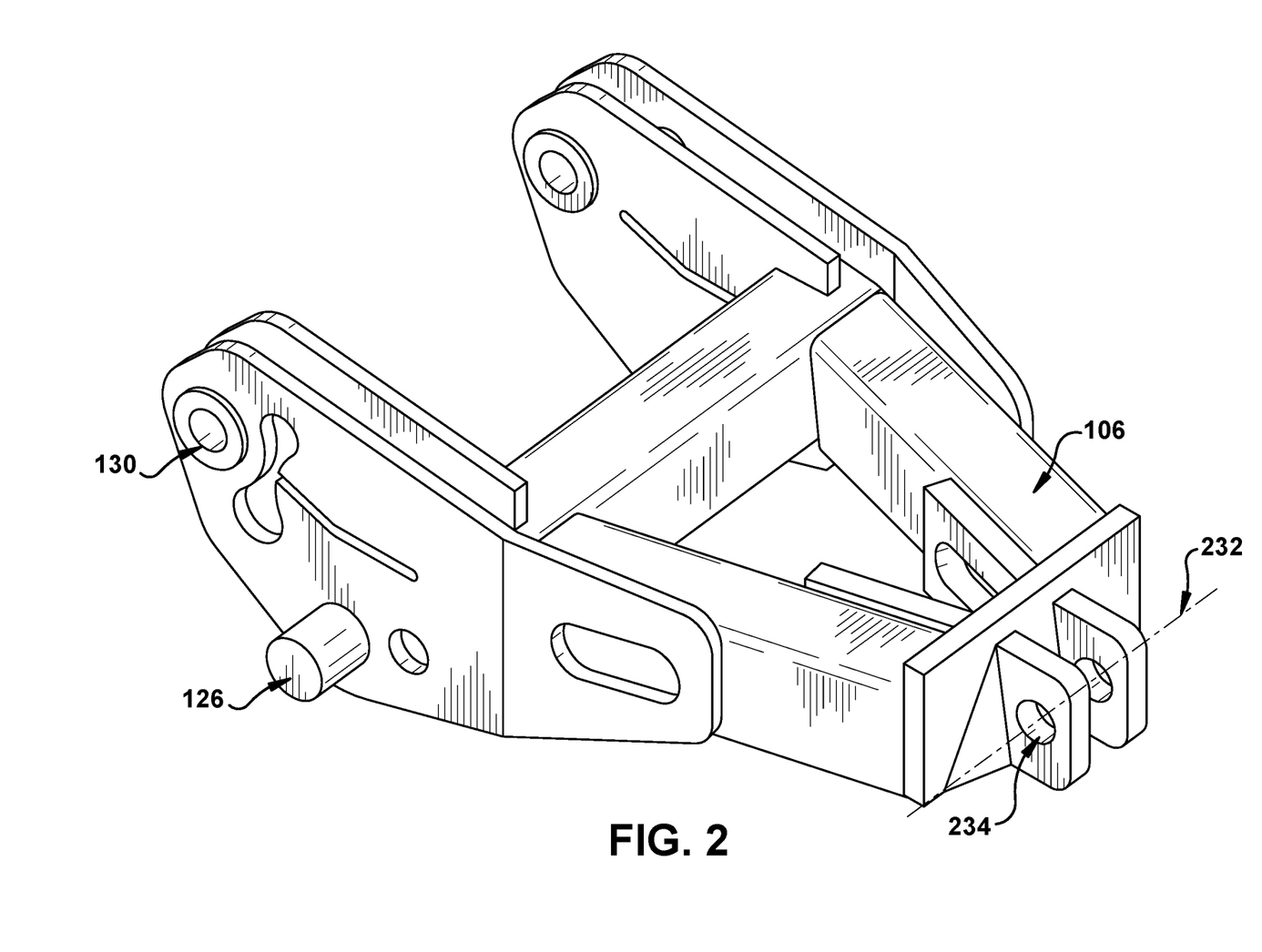
FIG. 2 is a component diagram illustrating one implementation of one or more portions of one or more systems described herein.
Figure 3:
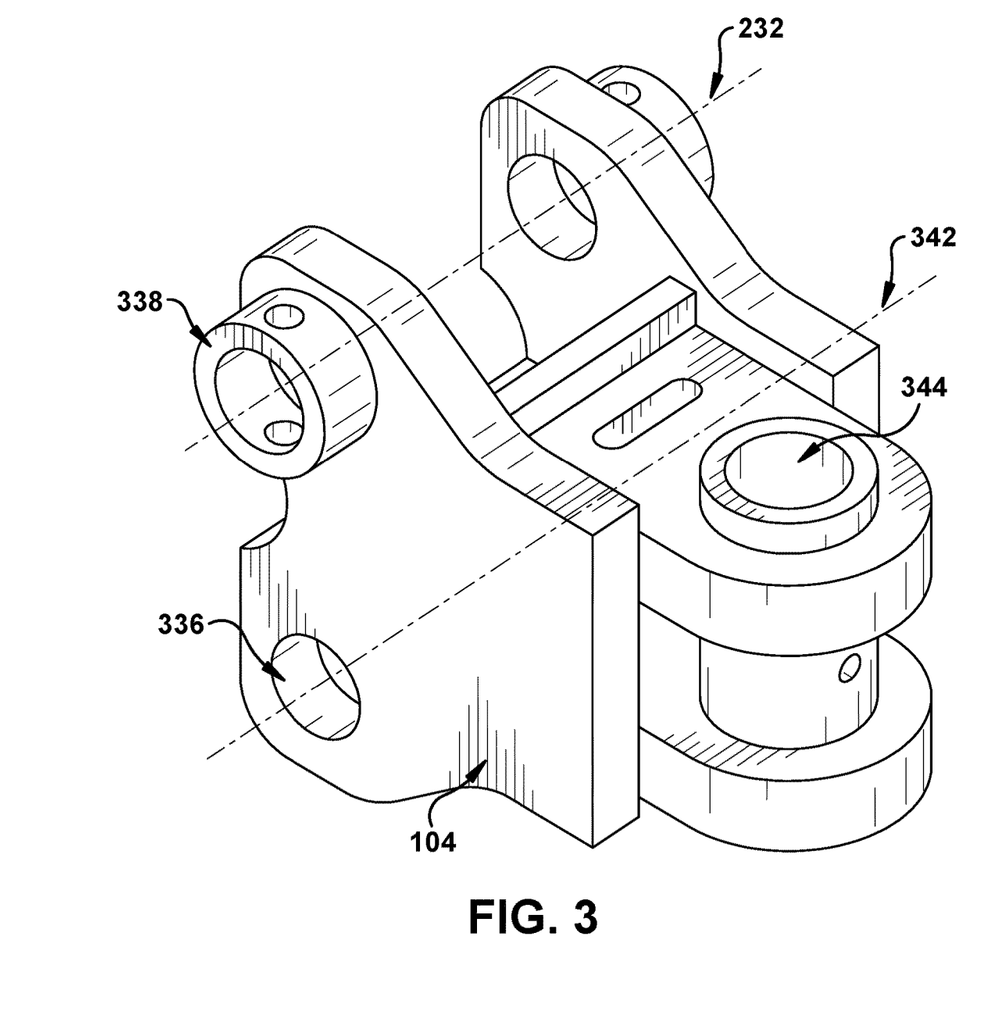
FIG. 3 is a component diagram illustrating one implementation of one or more portions of one or more systems described herein.

In one implementation, as illustrated in FIG. 3, with continued reference to FIGS. 1 and 2, the front portion 102 can comprise a pivot member 104. The pivot member 104 can comprise the front coupler 344, which has an opening that is sized to receive a coupling pin 118 that couples the front portion 102 to the rear portion 105. In some implementations, the front coupler 344 can comprise a bushing that is sized to fit the coupling pin 118. Further, the rear member 106 can be pivotably coupled with the pivot member 104 at a first pitch axis 232 (e.g., the top horizontal pitch axis of the pivot member 104). In this implementation, the rear member 106 can comprise a front coupling 234 at the first pitch axis 232, and the pivot member 104 can comprise a top rear coupling 338 at the first pitch axis 232. Further, a top horizontal pitch axis pin 340 can be used to couple the two couplings 234, 338. This coupling between the pivot member 104 and rear member 106, at the first pitch axis 232, can provide for pivoting about the first pitch axis 232 between the rear member and the pivot member. That is, for example, the rear member 106 and pivot member 104 can pivot around the first pitch axis 232, independently of each other.

In one implementation, as illustrated in FIG. 2, with continued reference to FIGS. 1 and 3, and FIGS. 7A and 7B, the rear member 106 can comprise one or more arms that engage with the implement 796 at a rear end of the rear member in a pivotal arrangement at a second pitch axis 128. The rear member, rear coupling 130 to the implement 796 can provide for pivoting about the second pitch axis 128 between the rear member 106 and the implement 796. In some implementations, the rear member, rear coupling 130 can comprise a bushing that is sized to receive a rear member, rear coupling pin 792 that couples the rear member 106 to the implement 796. Further, in some implementations, the rear member 106 can comprise two rear couplings 130, respectively coupled to the implement 796 by rear coupling pins 792a, 792b.

Figure 4:
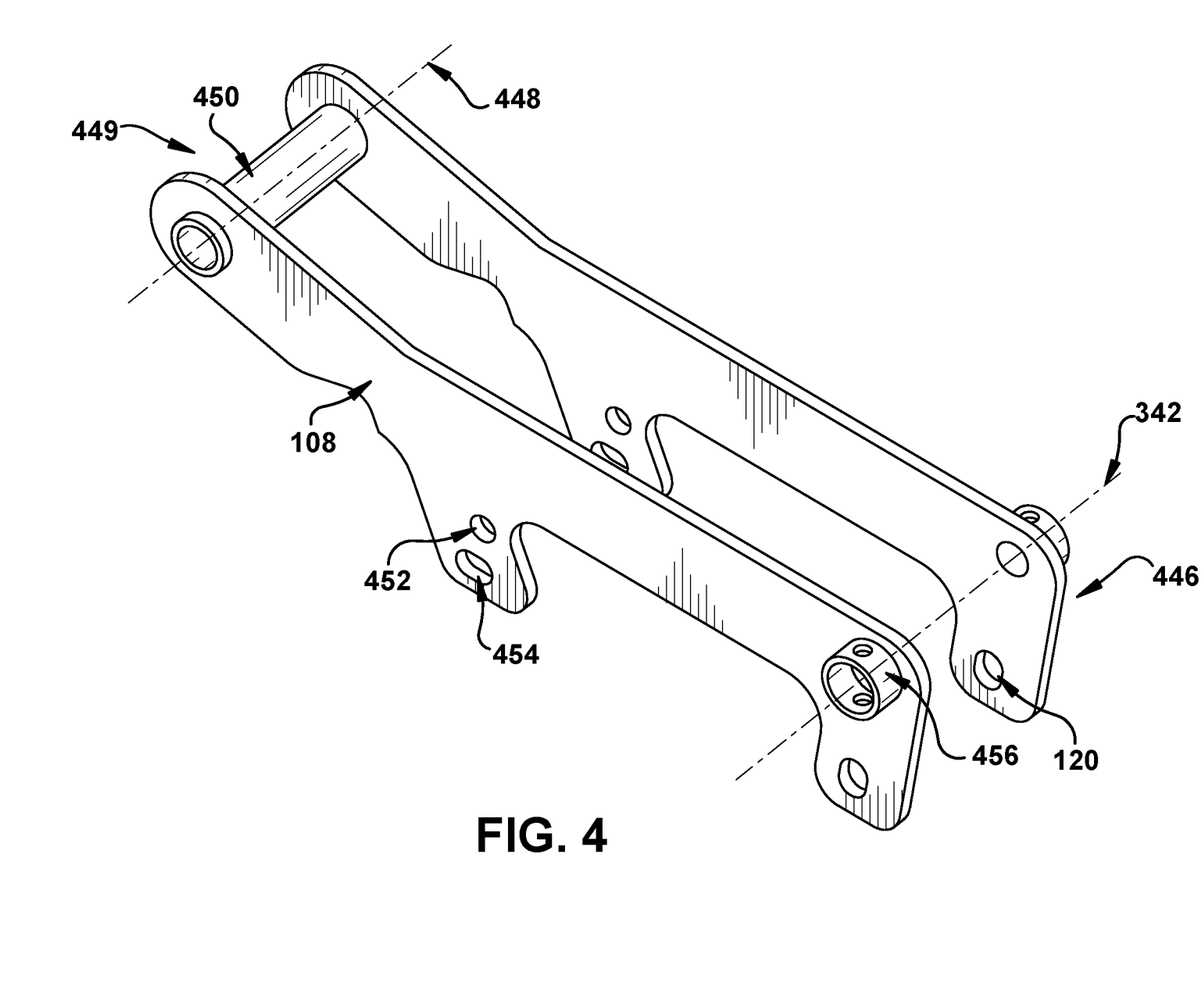
FIG. 4 is a component diagram illustrating one implementation of one or more portions of one or more systems described herein.

In one implementation, as illustrated in FIG. 4, the rear portion 105 can comprise a link member 108, which comprises one or more arms. The link member 108 can comprise a front end 446 and a rear end 449, a rear coupling 450 to the implement 796, and a link front coupling 456 to the pivot member 104. The front end 446 of the link member 108 is pivotably coupled with the pivot member 104 at a third pitch axis 342. The link front coupling 456 can be coupled to the pivot member 104 at the pivot rear lower horizontal coupling 336, such as using a link to pivot coupling pin 457. The coupling between the link member 108 and the pivot member 104 can provide for pivoting about the third pitch axis 342 between the link member 108 and the pivot member 104.

Further, the link member 108 can be pivotably coupled with the implement 796 at the rear end 449 of the link member 108, at a fourth pitch axis 448. The link member 108 can comprise a rear coupling 450, which can be coupled to a complementary coupling on the implement 796, such as using a coupling pin or the like. The rear coupling 450 of the link member 108 to the implement 796 can provide for pivoting about the fourth pitch axis 448 between the link member 108 and the implement 796.

Figure 7A:
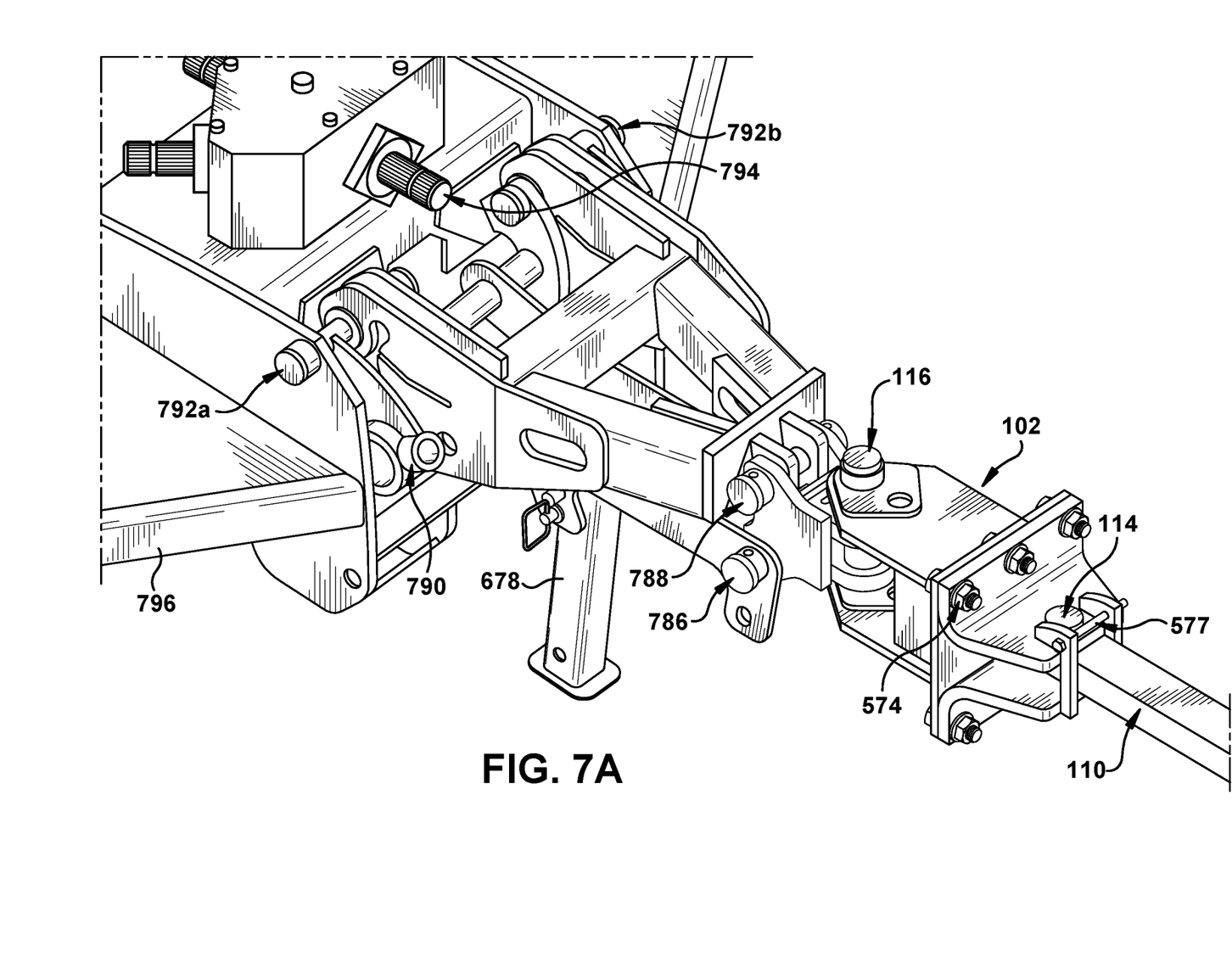
FIGS. 7A and 7B are component diagrams illustrating one implementation of one or more portion of one or more systems described herein.
Figure 7B:
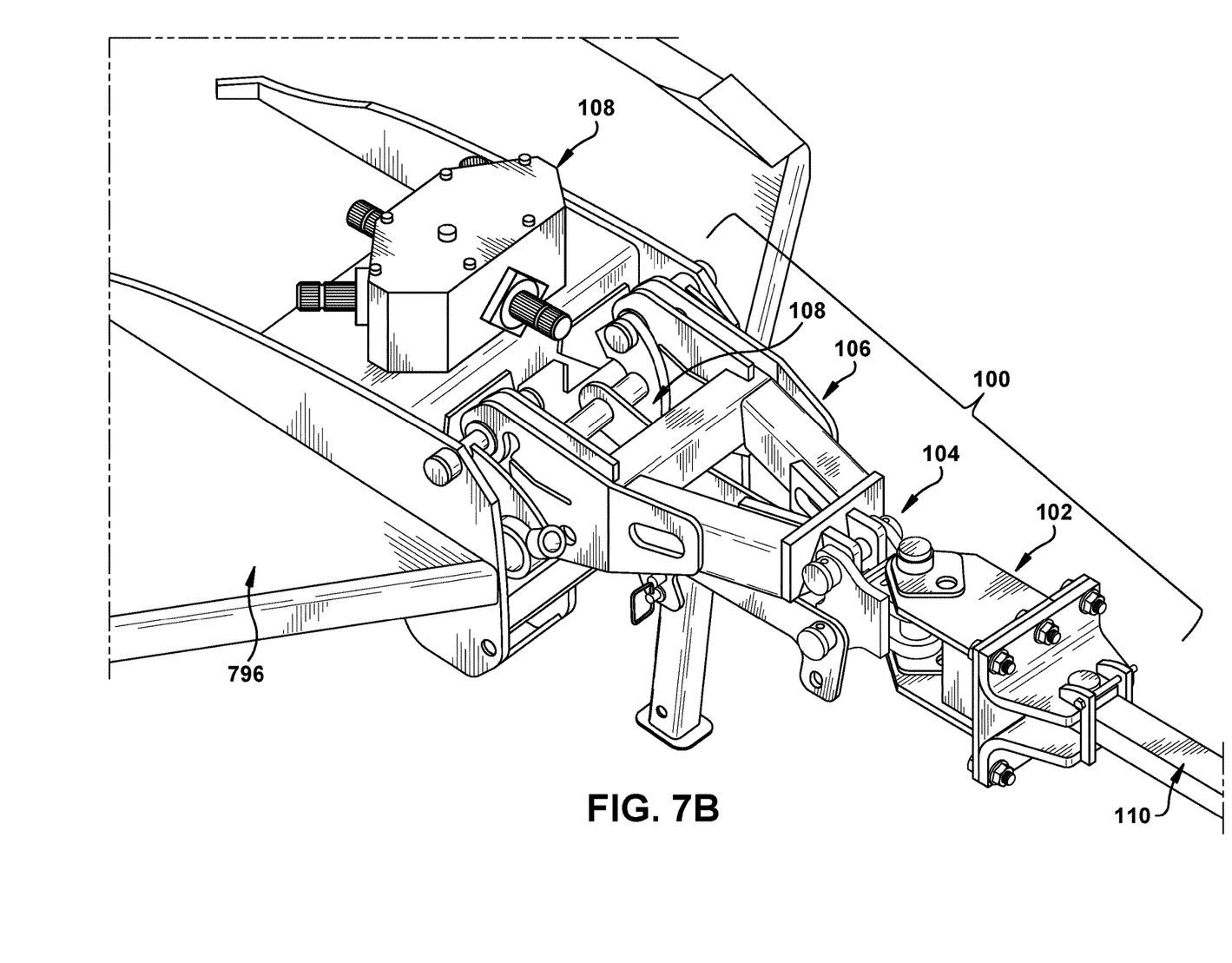
Figure 8A:
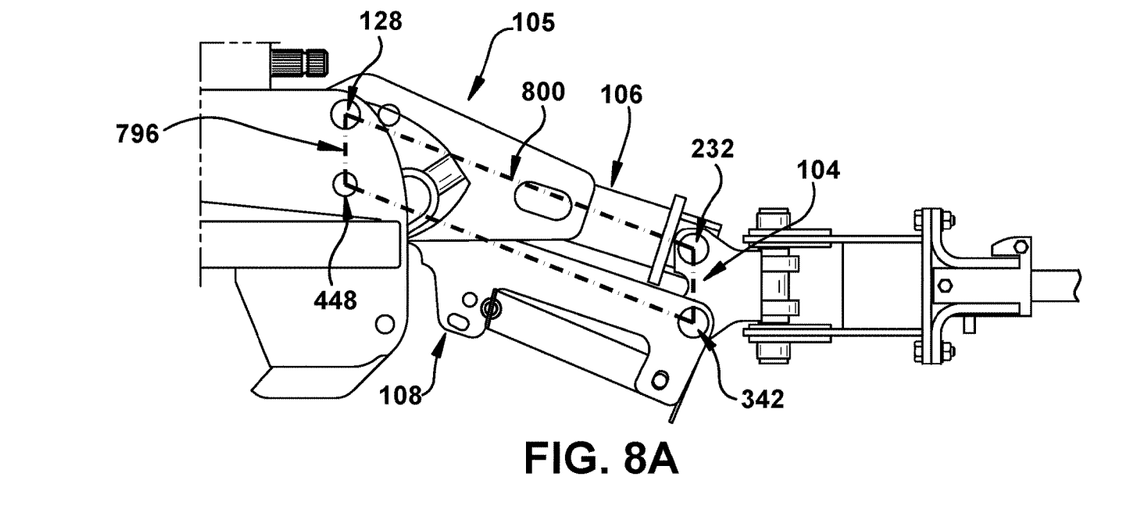
FIGS. 8A and 8B are component diagrams illustrating one implementation of one or more portion of one or more systems described herein.
Figure 8B:
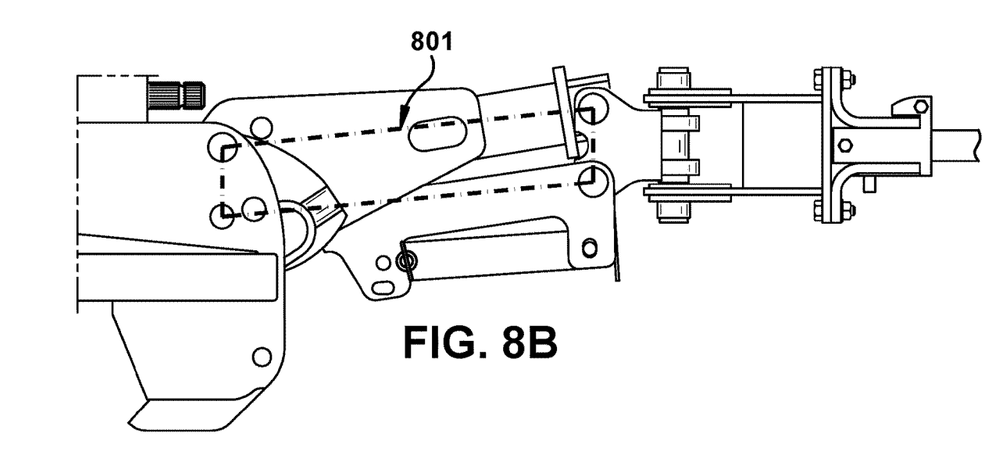

As illustrated in FIGS. 8A and 8B, with continued reference to FIGS. 1-5, 7a and 7B, component diagrams illustrating one or more portions of the systems described herein, the rear portion 105 comprises a four-bar mechanism or linkage 800, 801. In this example implementation, the four bar linkage 800, 801 comprises the rear member 106, which comprises the first pitch axis 232 at a front end of the rear member 106, and a second pitch axis 128 at a rear end of the rear member 106. Further, the four bar linkage 800, 801 comprises the link member 108, which comprises a front end 446 and a rear end 449, and a third pitch axis 342 at the front end 446 and a fourth pitch axis 448 at the rear end 449. In this implementation, the second and fourth pitch axes 128, 448 are respectively disposed in pivotable coupling with the implement 796.

A four bar linkage or mechanism can comprise four bodies (e.g., links) that are connected in a loop by four joints (e.g., pivot points). In this example implementation, the joints are configured so the links move in parallel planes, while pivoting about the respective pitch axes. As illustrated in FIGS. 8A and 8B, the four links include at least one arm of the rear member 106, at least one arm of the link member 108, the pivot member 104, and the implement 796. Further, the four joints include the respective couplings at the first pitch axis 232, the second pitch axis 128, the third pitch axis 342, and the fourth pitch axis 448.

FIG. 8A illustrates the four bar linkage 800 in a lowered position, wherein the implement is disposed in a raised position with respect to the drawbar, and therefore the vehicle. FIG. 8B illustrates the four bar linkage 801 in a raised position, wherein the implement is disposed in a lowered position with respect to the drawbar, and therefore the vehicle. As an example, the position of the tongue (e.g., comprising the equal angle hitch) can be determined by the suspension, which is controlled by a cylinder activated from the tractor. For example, if the cylinder is activated, raising the implement from the ground, the position of the tongue may be similar to that shown in FIG. 8A. In this example, the tongue will remain in this position at least until the cylinder is activated again to a different position. In this way, for example, when the tractor operator raises or lowers the suspension the hitch can always remain parallel to the ground.

Figure 6:
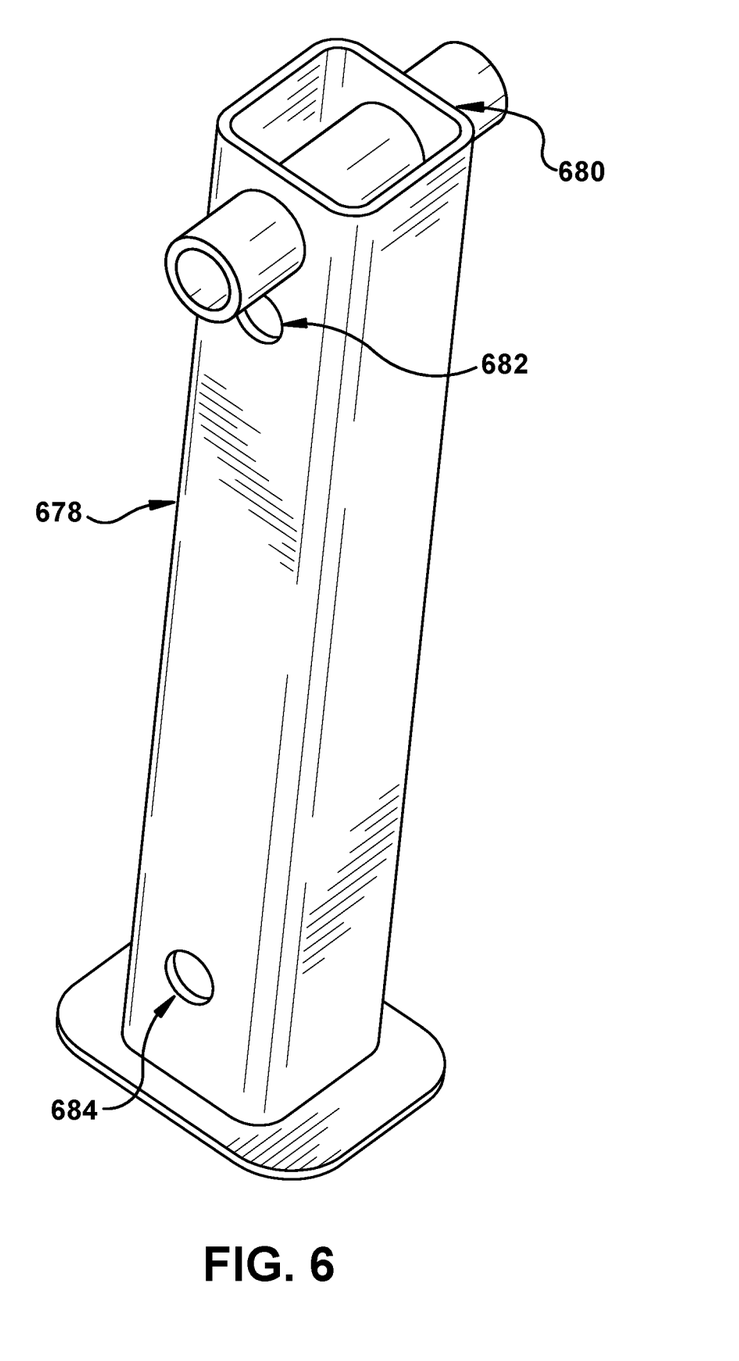
FIG. 6 is a component diagram illustrating one implementation of one or more portions of one or more systems described herein.

In one implementation, as illustrated in FIG. 6, with continued reference to FIGS. 1, 4 and 7A, the exemplary hitch 100 can comprise a jackstand 678 that is operably coupled with the link member 108. For example, the jackstand 678 can comprise a coupling 680, which can comprise a bushing, which couples with the link member 108 at a jackstand coupling 452, such as using a coupling pin, bolt, fastener, or the like. Further, the jackstand 678 can be selectably movable between a vertical jacked position and a horizontal stowed position. In this implementation, the jackstand 678 can comprise a vertical stowage pin holder 682 that allows for a pin 122 to be inserted through it, and into a jackstand vertical pin stowage hole 454 in the link member 108, to selectably secure the jackstand 678 in the vertical position. For example, the jackstand 678 may be placed in the vertical position when the hitch 100 is decoupled from the vehicle. Additionally, the jackstand 678 can comprise a horizontal stowage pin holder 684, through which a stowage pin 122 can be inserted, and into a jackstand horizontal stowage hole 120 to hold the jackstand 678 in the horizontal position, such as when the vehicle in coupled with the hitch 100.

In alternate implementations, the jackstand 678 can be coupled with the rear member 106. That is, for example, the jackstand 678 can comprise a coupling 680, which can comprise a bushing, which couples with the rear member 106 at a jackstand coupling in the rear member 106, such as using a coupling pin, bolt, fastener, or the like.

The word "exemplary" is used herein to mean serving as an example, instance or illustration. Any aspect or design described herein as "exemplary" is not necessarily to be construed as advantageous over other aspects or designs. Rather, use of the word exemplary is intended to present concepts in a concrete fashion. As used in this application, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Further, At least one of A and B and/or the like generally means A or B or both A and B. In addition, the articles "a" and "an" as used in this application and the appended claims may generally be construed to mean "one or more" unless specified otherwise or clear from context to be directed to a singular form.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. Furthermore, the claimed subject matter may be implemented as a method, apparatus or article of manufacture. Of course, those skilled in the art will recognize many modifications may be made to this configuration without departing from the scope or spirit of the claimed subject matter.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure. In addition, while a particular feature of the disclosure may have been disclosed with respect to only one of several implementations, such feature may be combined with one or more other features of the other implementations as may be desired and advantageous for any given or particular application. Furthermore, to the extent that the terms "includes," "having," "has," "with," or variants thereof are used in either the detailed description or the claims, such terms are intended to be inclusive in a manner similar to the term "comprising."

The implementations have been described, hereinabove. It will be apparent to those skilled in the art that the above methods and apparatuses may incorporate changes and modifications without departing from the general scope of this invention. It is intended to include all such modifications and alterations in so far as they come within the scope of the appended claims or the equivalents thereof.

What is claimed is:

1. A hitch device for coupling a vehicle to an implement, comprising:
   a front portion comprising a drawbar adapter engaging with a drawbar coupled with the vehicle, the front portion comprising a rear coupler disposed in a mid yaw axis; and
   a rear portion comprising a rear member engaging with the implement, the rear portion comprising a front coupler coupled with the rear coupler of the front portion in the mid yaw axis providing for pivoting about the mid yaw axis between the front portion and the rear portion, the rear portion comprising a pivot member comprising the front coupler having an opening sized to receive a coupling pin that couples the front portion to the rear portion;
   wherein the mid yaw axis is disposed substantially equidistant from a power output of the vehicle and a power input to the implement.

2. The hitch of claim 1, the front portion comprising a front member operably, fixedly engaged with the drawbar adapter, the front member comprising the rear coupler comprising an opening sized to receive a coupling pin that couples the front portion to the rear portion.

3. The hitch of claim 1, the rear member pivotably coupled with the pivot member at a first pitch axis, providing for pivoting about the first pitch axis between the rear member and the pivot member.

4. The hitch of claim 1, rear member engaging with the implement at a rear end of the rear member in a pivotal arrangement at a second pitch axis providing for pivoting about the second pitch axis between the rear member and the implement.

5. The hitch of claim 1, the rear portion comprising a link member comprising a front end and a rear end, the front end of the link member pivotably coupled with the pivot member at a third pitch axis providing for pivoting about the third pitch axis between the link member and the pivot member.

6. The hitch of claim 5, the link member pivotably coupled with the implement at a rear end of the link member, at a fourth pitch axis providing for pivoting about the fourth pitch axis between the link member and the implement.

7. The hitch of claim 5, comprising a jackstand selectably movable between a vertical jacked position and a horizontal stowed position.

8. The hitch of claim 1, the rear portion comprising a four-bar mechanism comprising:
   the rear member comprising a first pitch axis at a front end of the rear member and a second pitch axis at a rear end of the rear member; and
   a link member comprising a front end and a rear end, and a third pitch axis at the front end and a fourth pitch axis at the rear end;
   wherein the second and fourth pitch axes are respectively disposed in pivotable coupling with the implement.

9. The hitch of claim 1, the drawbar adapter comprising a drawbar coupler to couple with the drawbar and to mitigate yaw rotation of the drawbar with respect to the drawbar adapter.

10. The hitch of claim 9, the drawbar coupler comprising a pin that couples with a receiving hole in the drawbar.

\* \* \* \* \*